US010721920B2

(12) United States Patent
Alexander et al.

(10) Patent No.: US 10,721,920 B2
(45) Date of Patent: Jul. 28, 2020

(54) TRAP

(71) Applicants: Glen Hamilton Alexander, Green Head (AU); Anthony Stephenson Haygarth, Donneybrook (AU)

(72) Inventors: Glen Hamilton Alexander, Green Head (AU); Anthony Stephenson Haygarth, Donneybrook (AU)

(73) Assignees: Glen Hamilton Alexander, Greenhead (AU); Anthony Stephenson Haygarth, Dooneybrook (AU)

( * ) Notice: Subject to any disclaimer, the term of this patent is extended or adjusted under 35 U.S.C. 154(b) by 190 days.

(21) Appl. No.: 15/748,454

(22) PCT Filed: Jun. 29, 2016

(86) PCT No.: PCT/AU2016/050556
§ 371 (c)(1),
(2) Date: Jan. 29, 2018

(87) PCT Pub. No.: WO2017/015699
PCT Pub. Date: Feb. 2, 2017

(65) Prior Publication Data
US 2018/0213757 A1 Aug. 2, 2018

(30) Foreign Application Priority Data

Jul. 29, 2015 (AU) .............................. 2015903022

(51) Int. Cl.
*A01K 69/08* (2006.01)
*A01M 23/20* (2006.01)
*A01M 23/08* (2006.01)

(52) U.S. Cl.
CPC ............. *A01K 69/08* (2013.01); *A01M 23/08* (2013.01); *A01M 23/20* (2013.01)

(58) Field of Classification Search
CPC ........ A01K 69/08; A01K 69/00; A01K 69/06; A01K 69/10; A01M 23/00; A01M 23/02;
(Continued)

(56) References Cited

U.S. PATENT DOCUMENTS 4,159,590 A 7/1979 Palfalvy
5,345,710 A * 9/1994 Bitz ..................... A01M 23/20
43/61
(Continued)

FOREIGN PATENT DOCUMENTS

AU 2004100595 A4 8/2004
WO 2007/059581 A1 5/2007

OTHER PUBLICATIONS

International Written Opinion from International Application No. PCT/AU16/050556, dated Sep. 12, 2016, 5 pages.
(Continued)

*Primary Examiner* — Darren W Ark
*Assistant Examiner* — William L Gmoser
(74) *Attorney, Agent, or Firm* — TraskBritt

(57) ABSTRACT

An octopus trap that includes a housing defining an interior containment space; an entrance opening to the interior containment space through which an octopus may enter the interior containment space; a trap door assembly that includes a trap door that is biased toward a first, closed position in which the entrance opening is blocked, the trap door being displaceable between the closed position and a second, open position in which the entrance opening is revealed; a trigger assembly that is capable of retaining the trap door in its open position against its bias, and that is capable of being triggered by an octopus from inside the containment space such that, when triggered, it causes the trap door to displace from its open position to its closed
(Continued)

position and wherein the trigger assembly is capable of retaining the trap door in its closed position once triggered.

12 Claims, 23 Drawing Sheets

(58) Field of Classification Search
CPC ...... A01M 23/08; A01M 23/14; A01M 23/16; A01M 23/18; A01M 23/20
USPC .............. 43/58, 100, 105, 60, 61, 64, 65, 67
See application file for complete search history.

(56) References Cited

U.S. PATENT DOCUMENTS

| | | | |
|---|---|---|---|
| 6,739,086 B1* | 5/2004 | Lamb | A01M 23/02 43/98 |
| 8,505,234 B2* | 8/2013 | Nelson | A01M 25/004 43/67 |
| 2004/0025410 A1* | 2/2004 | Shapland | A01M 23/08 43/65 |
| 2010/0018105 A1* | 1/2010 | Gauker | A01M 23/30 43/81 |
| 2012/0117852 A1 | 5/2012 | Baker | |

OTHER PUBLICATIONS

International Search Report from International Application No. PCT/AU16/050556, dated Sep. 12, 2016, 4 pages.

* cited by examiner

TRAP

CROSS-REFERENCE TO RELATED APPLICATIONS

This application is a national phase entry under 35 U.S.C. § 371 of International Patent Application PCT/AU2016/050556, filed Jun. 29, 2016, designating the United States of America and published in English as International Patent Publication WO 2017/015699 A1 on Feb. 2, 2017, which claims the benefit under Article 8 of the Patent Cooperation Treaty to Australian Patent Application Serial No. 2015903022, filed Jul. 29, 2015.

TECHNICAL FIELD

This application relates to traps for capturing marine species. In particular, the application relates to a trap that is useful for capturing an octopus.

BACKGROUND

There is an ongoing need to provide improvements in traps for capturing marine species such as octopuses, or to provide an alternative trap having useful features, at least to provide users with a useful choice. Octopus species are extremely difficult to capture, given that they easily slip out of narrow openings and have been known to unlock or open traps set by fisherman. This means that traps can be rather heavy and convoluted, are easily filled with sand that is difficult to remove, and are difficult to re-set when retrieved. This disclosure addresses at least some of these issues.

BRIEF SUMMARY

According to one aspect of the disclosure, there is provided a trap for catching an octopus that includes:
- a housing defining an interior containment space with an entrance opening to the interior containment space through which an octopus may enter the interior containment space;
- a trap door assembly that includes a trap door that is biased toward a first, closed position in which the entrance opening is blocked, the trap door being displaceable between the closed position and a second, open position in which the entrance opening is revealed; a trigger assembly that is capable of retaining the trap door in its open position against its bias, and that is capable of being triggered by an octopus from inside the containment space such that, when triggered, it causes the trap door to displace from its open position to its closed position, thereby capturing the octopus within the interior containment space of the housing, and wherein the trigger assembly is capable of retaining the trap door in its closed position once triggered.

The trap door may be mounted onto a front end wall of the housing in a manner such that the trap door is capable of being displaced face-to-face or co-terminously with the front end wall between its closed position and open position. The trap door and end wall may be shaped and sized so that the trap door is capable of being displaced face-to-face or co-terminously with the front end wall between its closed position and open position while remaining coextensive with the front end wall, so as to avoid protruding beyond an outer peripheral boundary of the front end wall. The housing may be shaped and sized so that the interior space expands in transverse section from the entrance opening to form a funnel space that widens and transitions into a tunnel space. More particularly, the housing may include an elongated box-shaped tunnel member having an open end, a funnel member that includes the front end wall that defines the entrance opening and that includes a funnel formation that has a relatively narrower mouth-end that is shaped so as to fit over the entrance opening and that extends away from the end wall with its relative wider mouth terminating into the tunnel member, thereby forming the funnel space that widens and transitions into a tunnel space.

The trigger assembly may be capable of being triggered by an octopus from a position proximal or toward the funnel space of the housing. In another embodiment, the trigger assembly may be capable of being triggered by an octopus from a position distal from the funnel space of the housing. The trigger assembly may include a trigger arm that interacts with the trap door for retaining the trap door in its open position against its bias, and when triggered, to cause the trap door to displace from its open position to its closed position. The trigger assembly may include a link member that is attached at its one end to the trigger arm, and at its other end to a lure or bait, such that when the lure or bait is moved in a way that tensions the link member, the trigger arm is triggered, which causes the trap door to displace from its open position to its closed position. The bait may be positioned proximal to, or toward, the funnel space of the housing in one embodiment, while in another embodiment, it may be positioned distal to the funnel space of the housing, toward an opposed end of the housing. When the bait is positioned distal to the funnel space, the link member may be slidably contained by a guide attached to a rear wall of the housing, through which the link member may be passed.

The funnel member and trigger assembly may form an assembly unit that is removably receivable in an associated end portion of the tunnel member. The funnel member and trigger assembly unit may be removably secured within the housing by a biased latch in the form of a resiliently flexible base or sheet member. The resiliently flexible base or sheet member may be biased toward an interior of the housing, the latch being capable of interlocking with a catch formation protruding from a lower surface of the assembly unit when the assembly unit is positioned inside the housing. More particularly, the bottom wall of the tunnel member may define a cut-out that opens toward a front end of the bottom wall, with a generally rectangular-shaped sheet being mounted onto the bottom wall near a rear edge of the cut-out. The sheet may be shaped and sized so as to substantially span the cut-out and further may comprise a front end portion that slants slightly downward.

The sheet further may define a transversely extending slot spaced inwardly from the front end portion of the sheet, the sheet being formed from a material that enables the sheet to be resiliently deflectable downwardly while in use. In another embodiment, the assembly unit may be removably secured to the housing by way of a retaining member such as a screw that interferes with the removal of the assembly unit. A bottom wall of the housing includes slots to fill the interior space of the trap with water so as to cause sinking of the trap into the water, and to drain water from the interior space, usefully also allowing for the drainage of sand from the interior space when the trap is removed from the water.

The disclosure will now be described, by way of non-limiting example only, with reference to the following drawings.

DETAILED DESCRIPTION

Figure 1:
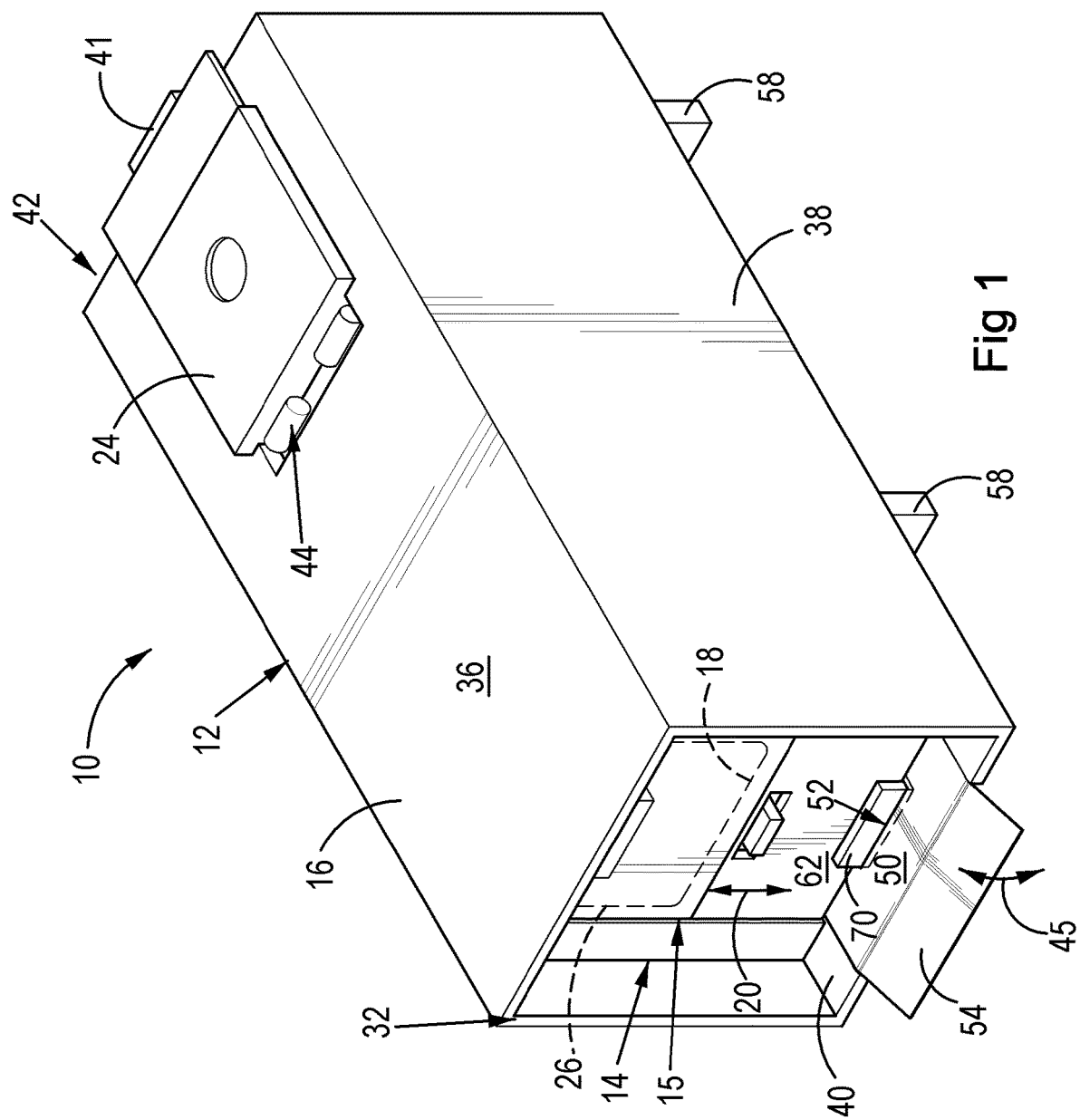
FIG. 1 shows a diagrammatic three-dimensional view from above a front end of a trap, in accordance with the disclosure.
Figure 2:
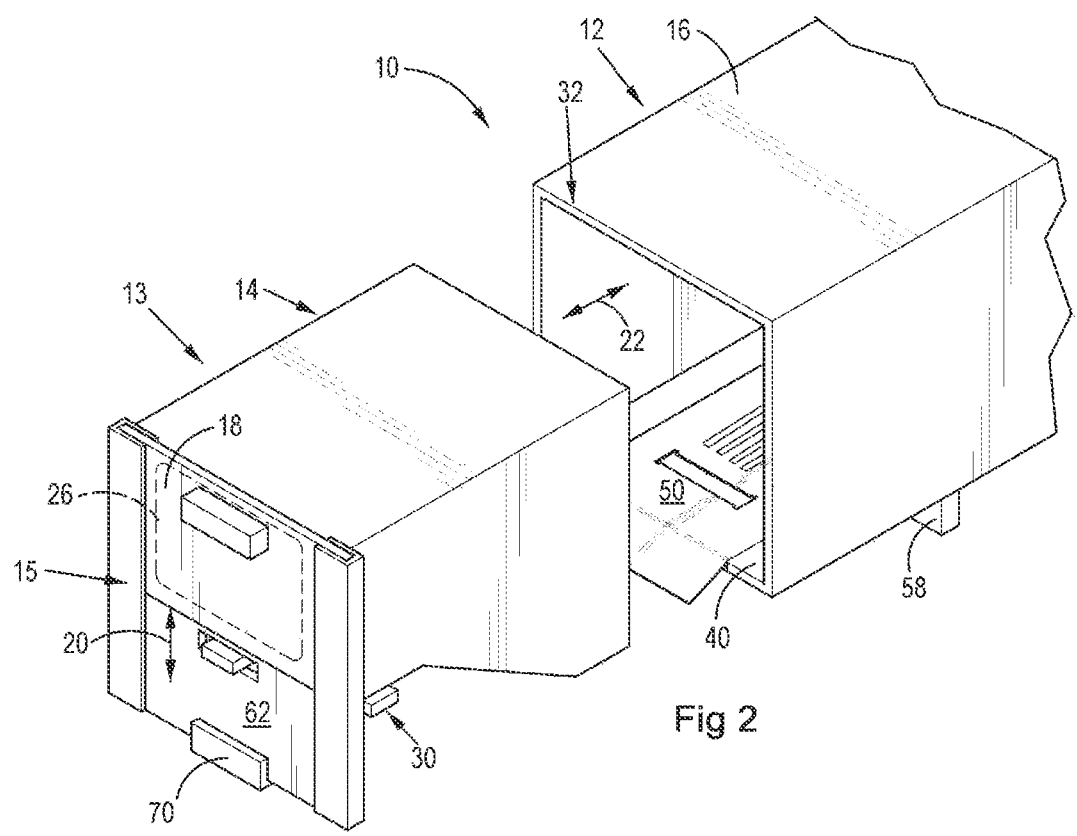
FIG. 2 shows a diagrammatic part exploded three-dimensional view from above the front end of the trap of FIG. 1.
Figure 3:
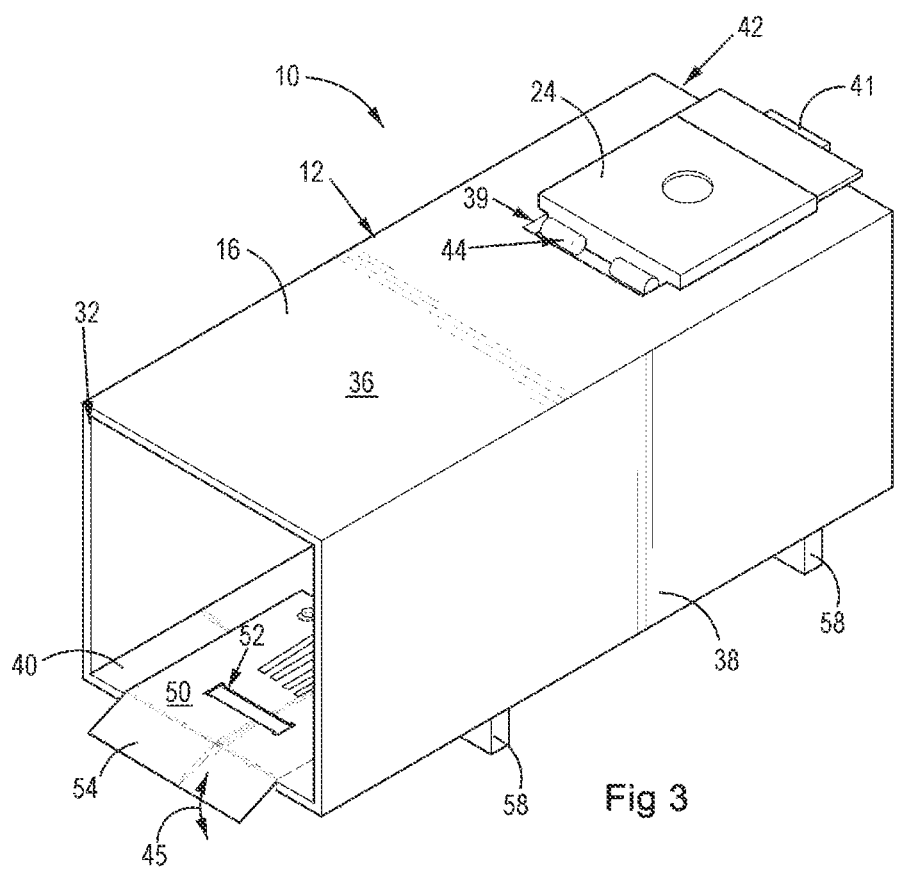
FIG. 3 shows a three-dimensional view from above a front end of a tunnel member forming part of a housing of the trap of FIG. 1.
Figure 4:
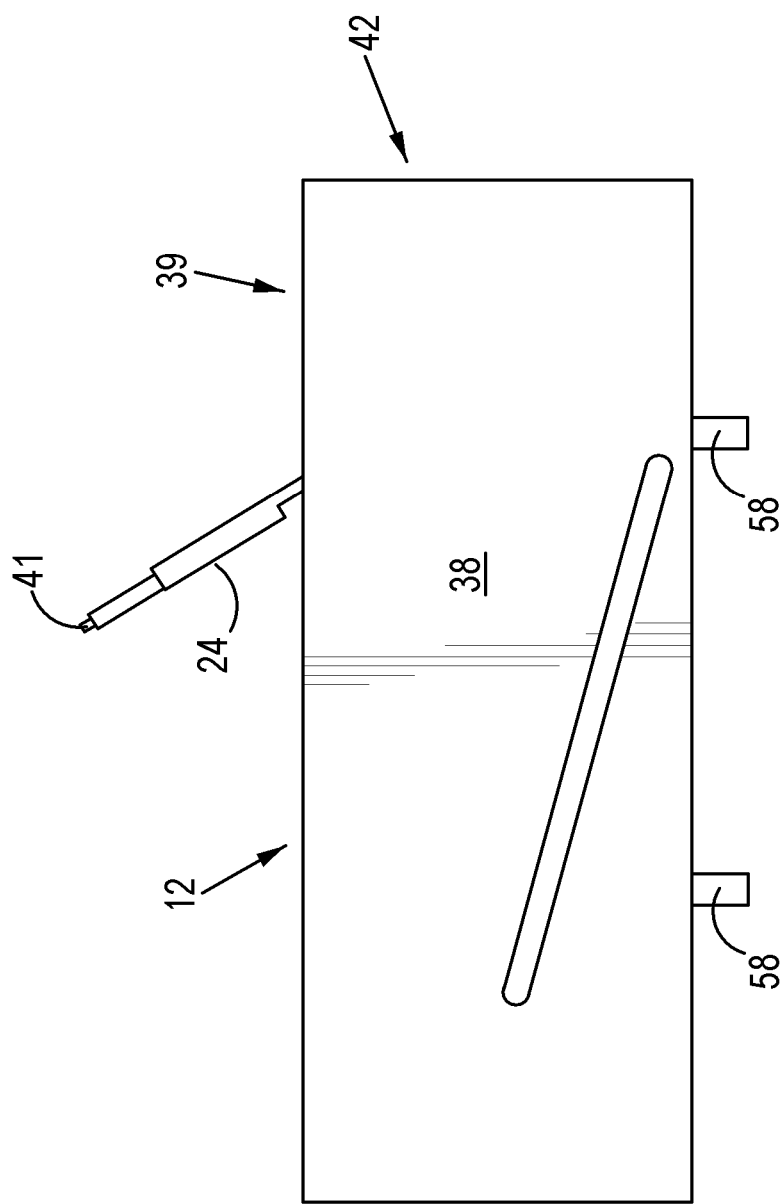
FIG. 4 shows a diagrammatic side elevation view of the tunnel member of FIG. 3.
Figure 5:
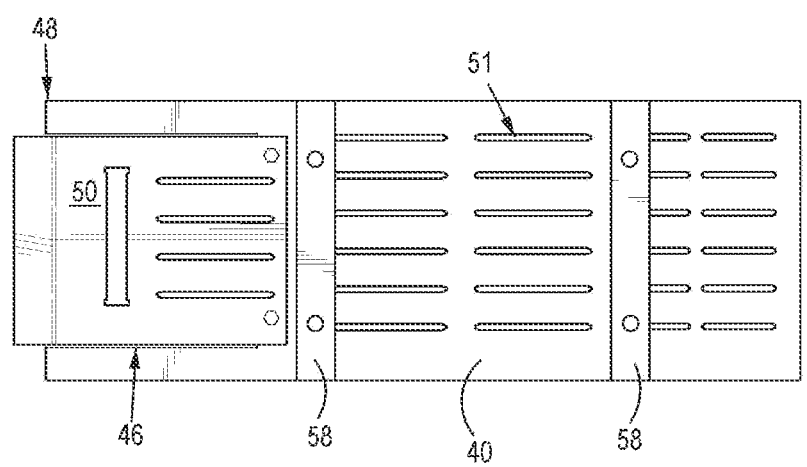
FIG. 5 shows a diagrammatic bottom view of the tunnel member of FIG. 3.
Figure 6:
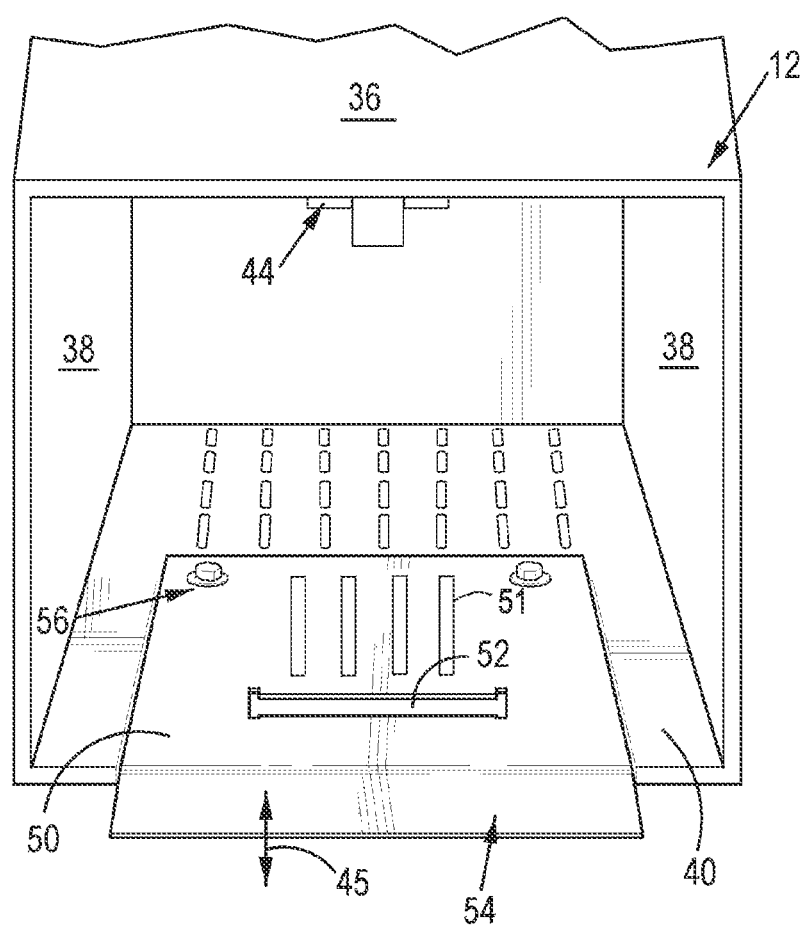
FIG. 6 shows a diagrammatic three-dimensional view from above a front end of the tunnel member of FIG. 4.
Figure 7:
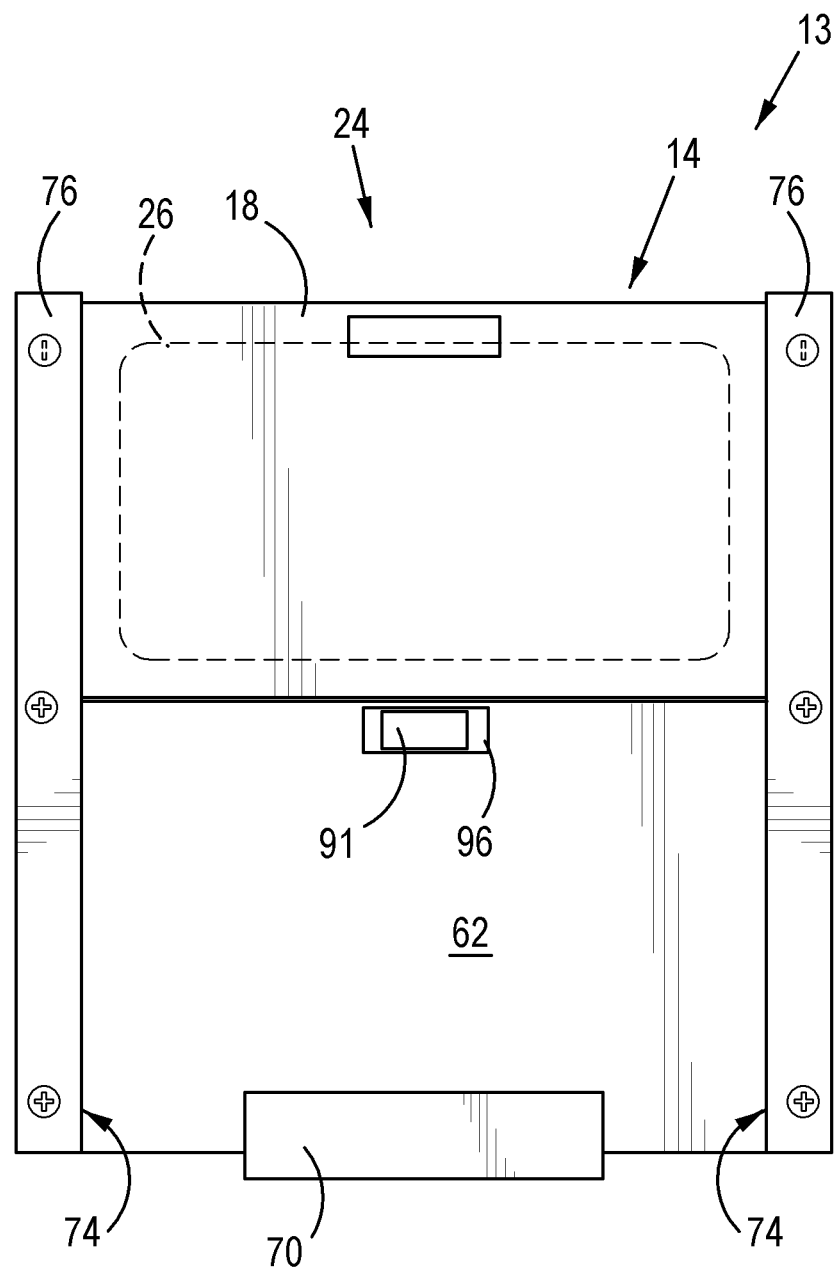
FIG. 7 shows a diagrammatic elevation view of a front end of an assembly unit that includes a trap door assembly having a trap door, a funnel member and a trigger assembly forming part of the trap of FIG. 1, with the trap door in a closed position.
Figure 8:
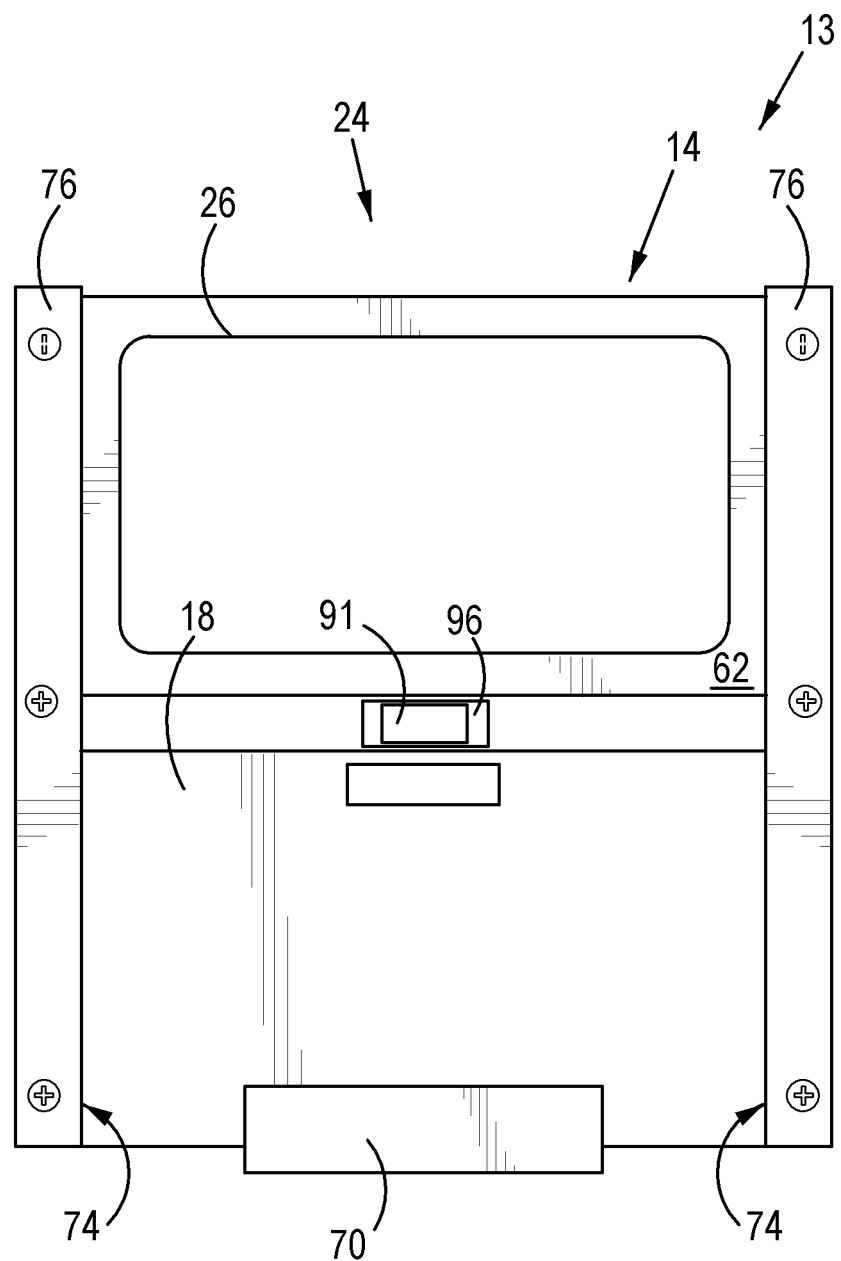
FIG. 8 shows a diagrammatic elevation view of a front end of the assembly unit of FIG. 7 with the trap door in an open position.
Figure 9:
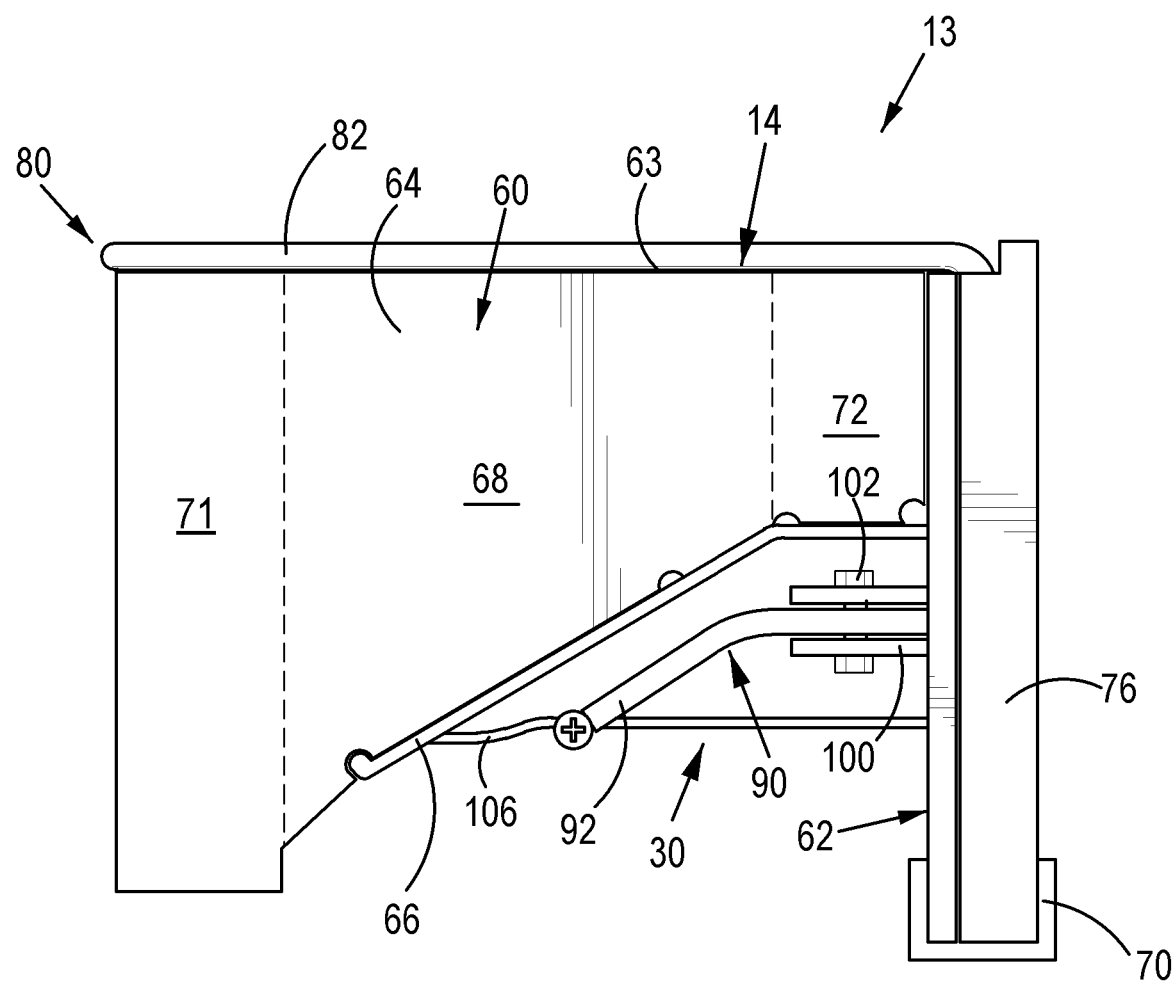
FIG. 9 shows a diagrammatic side elevation view of the assembly unit of FIG. 7.
Figure 10:
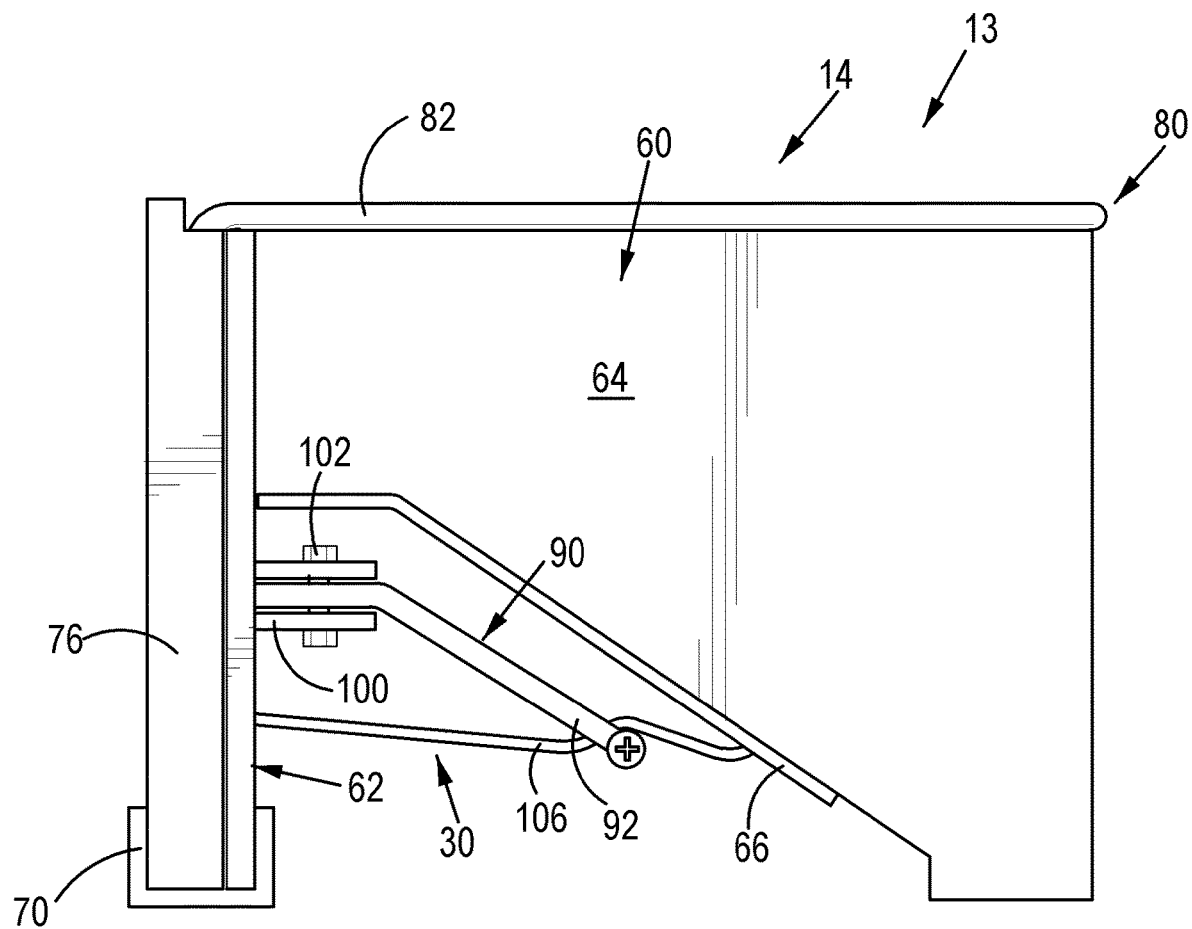
FIG. 10 shows a diagrammatic side elevation view of the assembly unit of FIG. 7 from another side.
Figure 11:
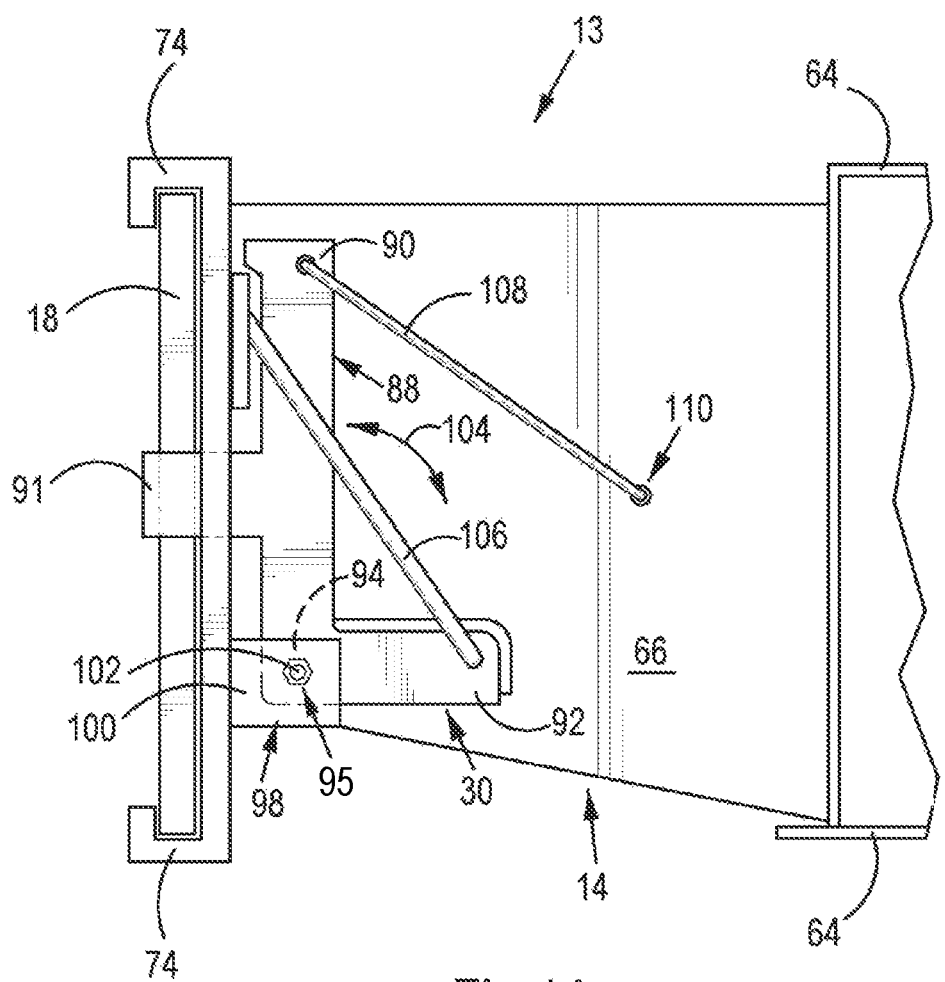
FIG. 11 shows a diagrammatic bottom view of the assembly unit of FIG. 7 with a trigger of the trigger assembly in a resting position.
Figure 12:
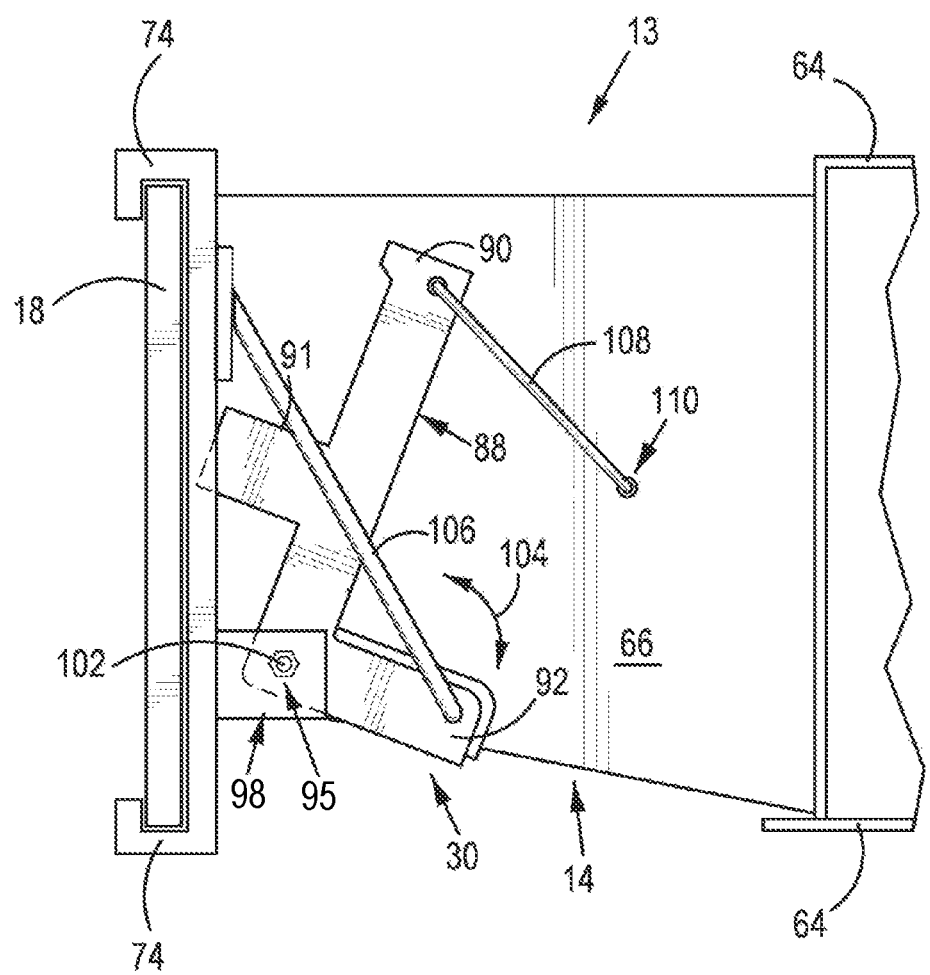
FIG. 12 shows a diagrammatic bottom view of the assembly unit of FIG. 7 with the trigger of the trigger assembly in a triggered position.
Figure 13:
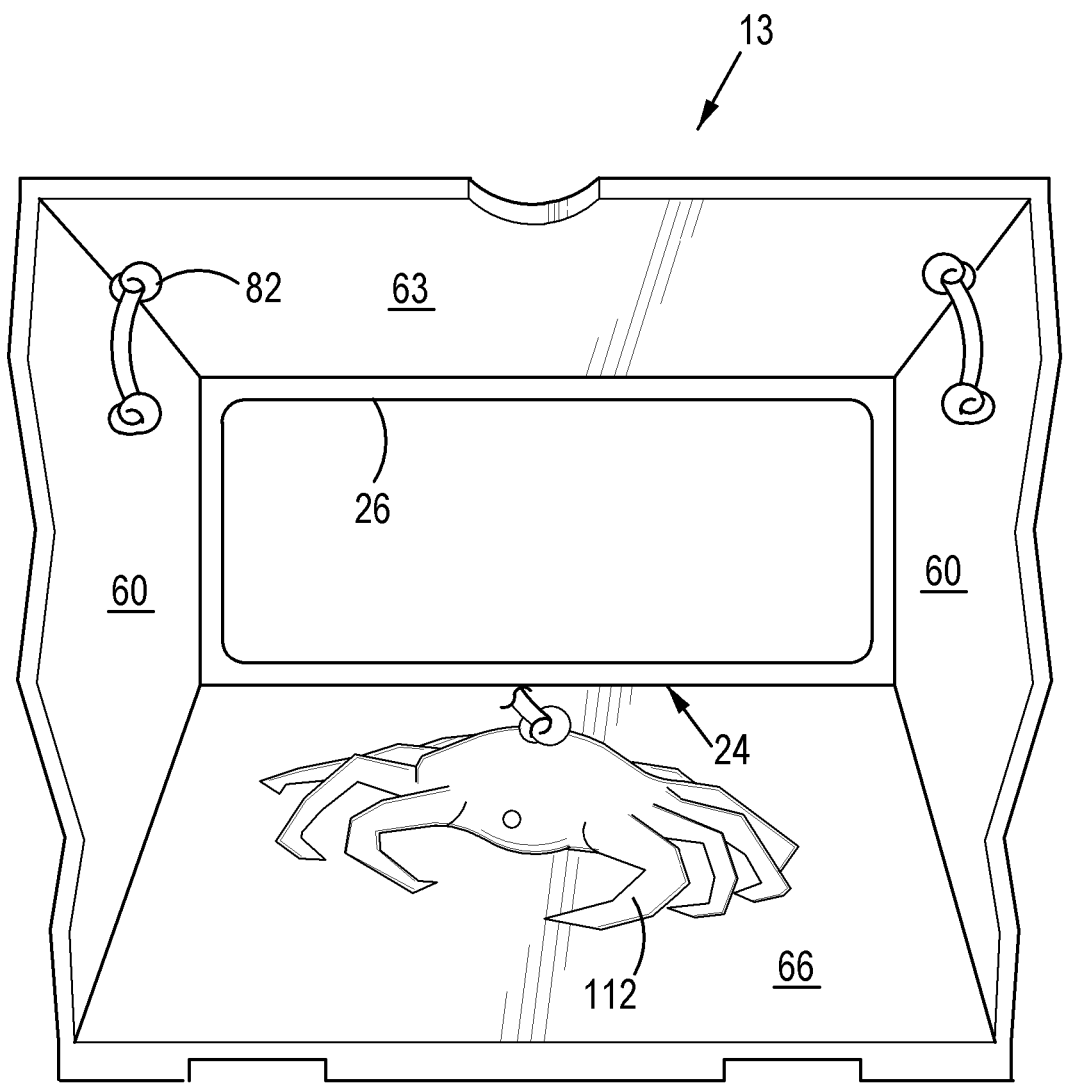
FIG. 13 shows a diagrammatic elevation view of a rear end of the assembly unit of FIG. 7.
Figure 14:
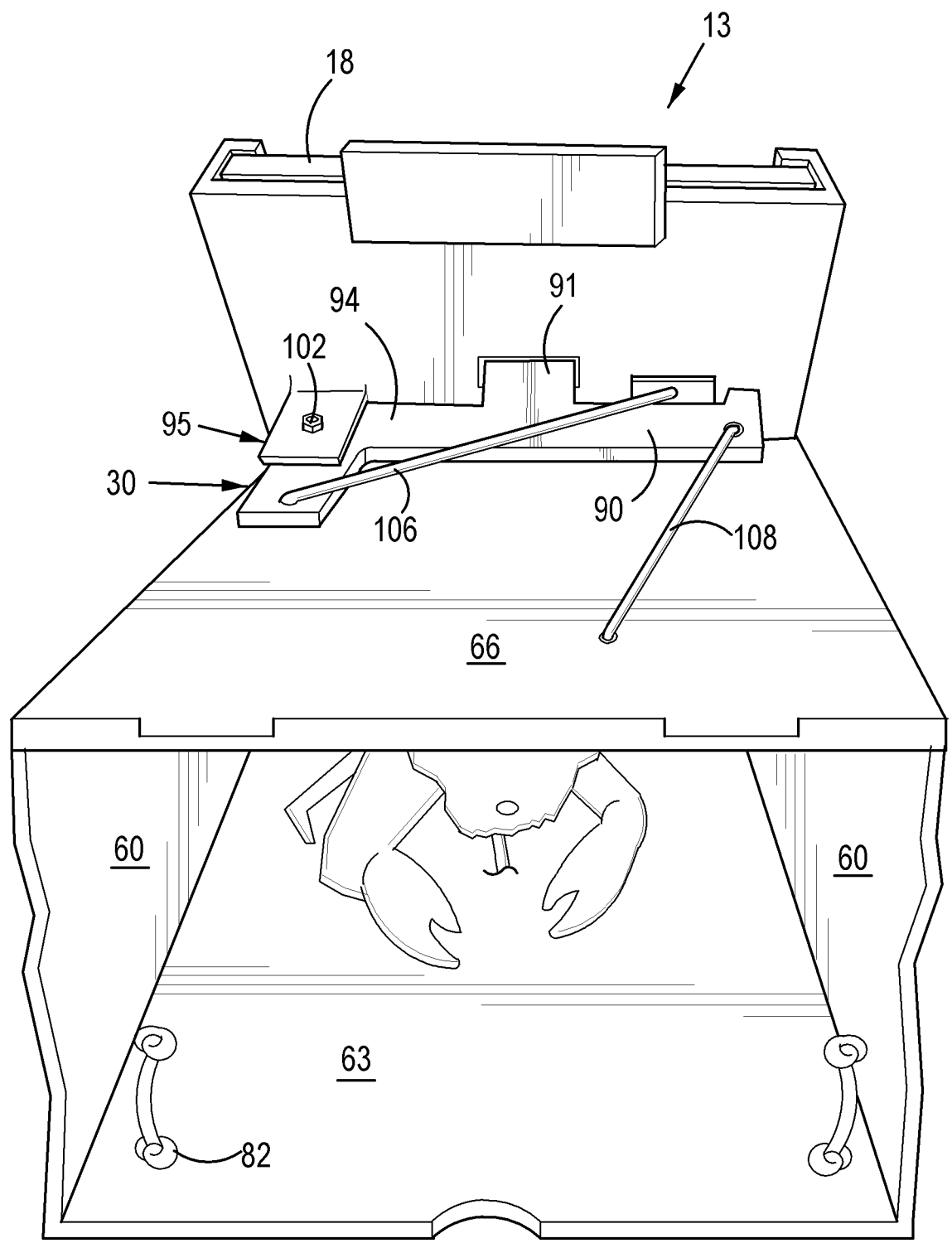
FIG. 14 shows a diagrammatic three-dimensional view of the assembly unit of FIG. 7 from above a rear side of the assembly unit.
Figure 15:
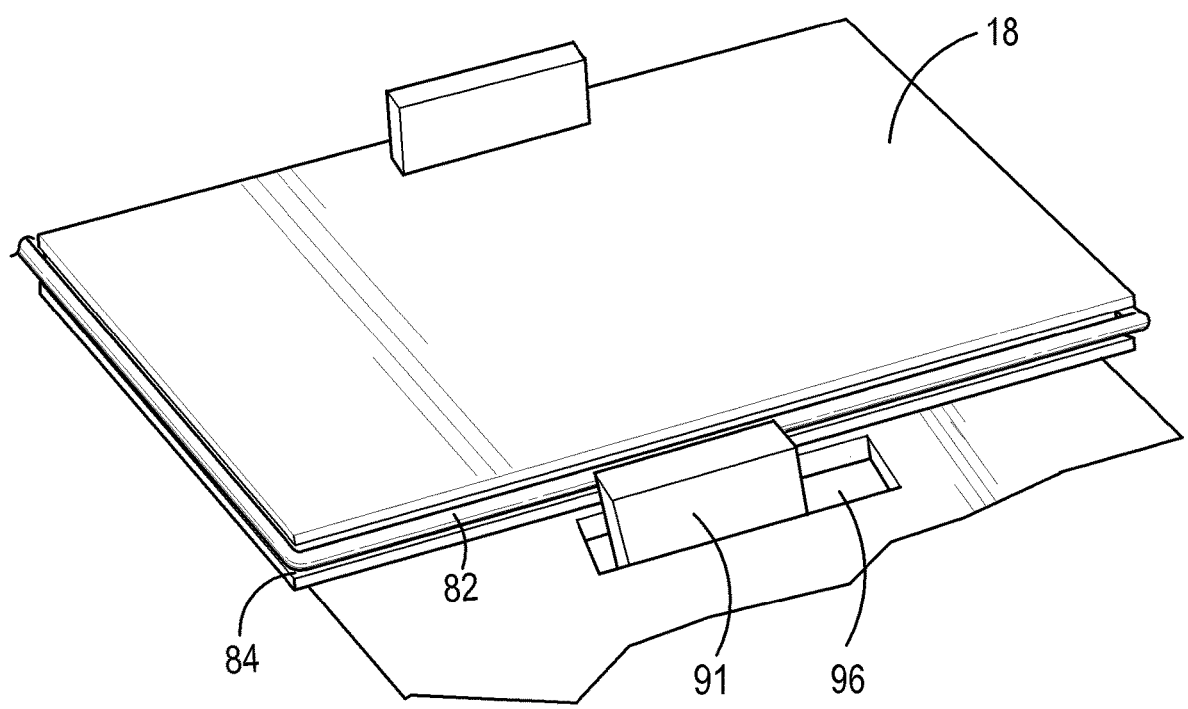
FIG. 15 shows a diagrammatic three-dimensional view of the assembly unit of FIG. 7 from above a bottom side of the funnel member.
Figure 16:
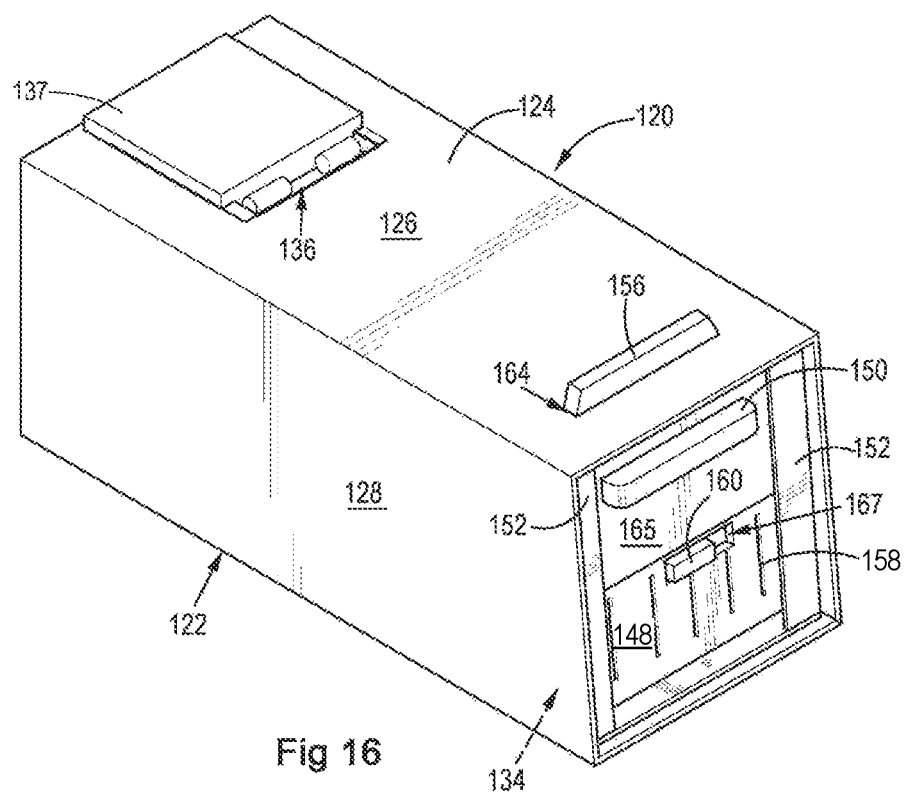
FIG. 16 shows a diagrammatic three-dimensional view from above a front end of another embodiment of a trap, in accordance with the disclosure.
Figure 17:
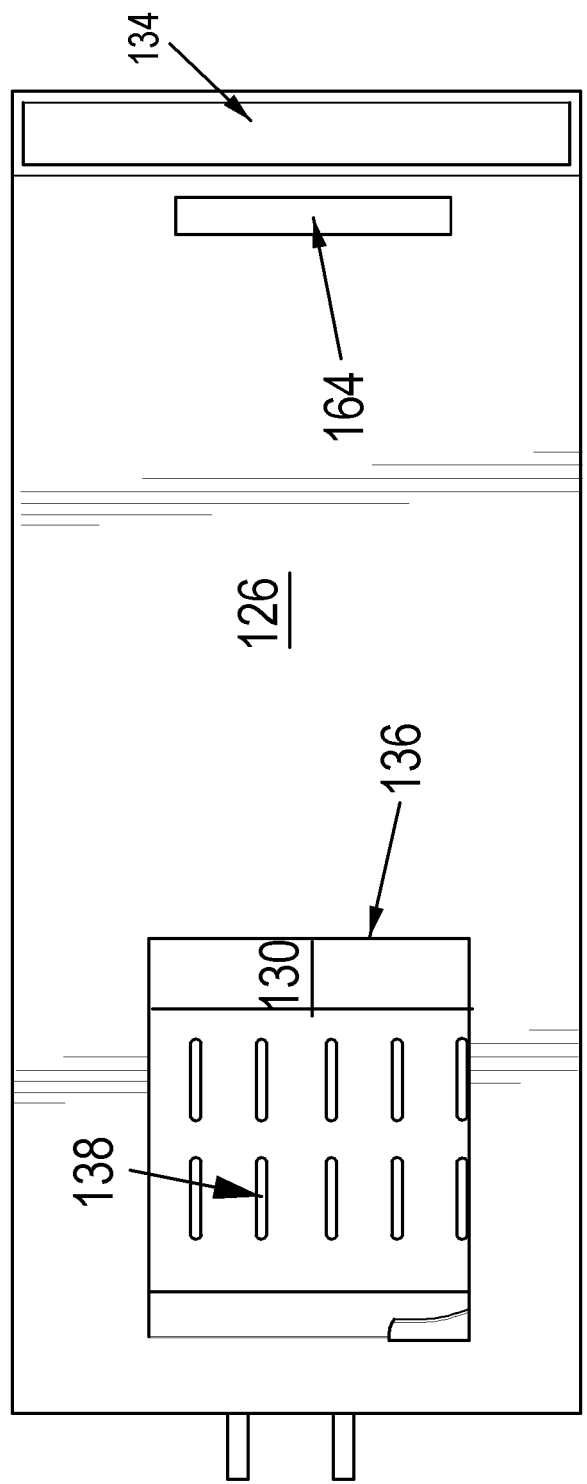
FIG. 17 shows a diagrammatic top view of a tunnel member forming part of the trap of FIG. 16.
Figure 18:
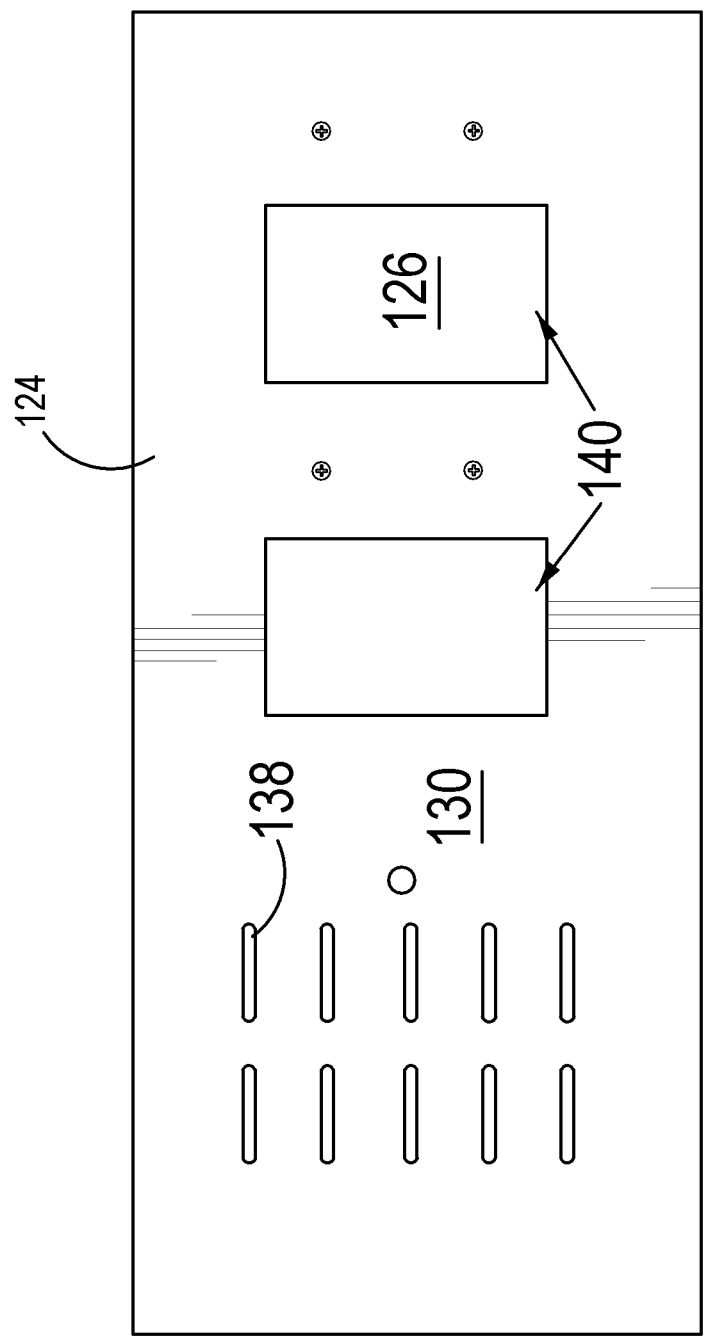
FIG. 18 shows a diagrammatic bottom view of the tunnel member of FIG. 17.
Figure 19:
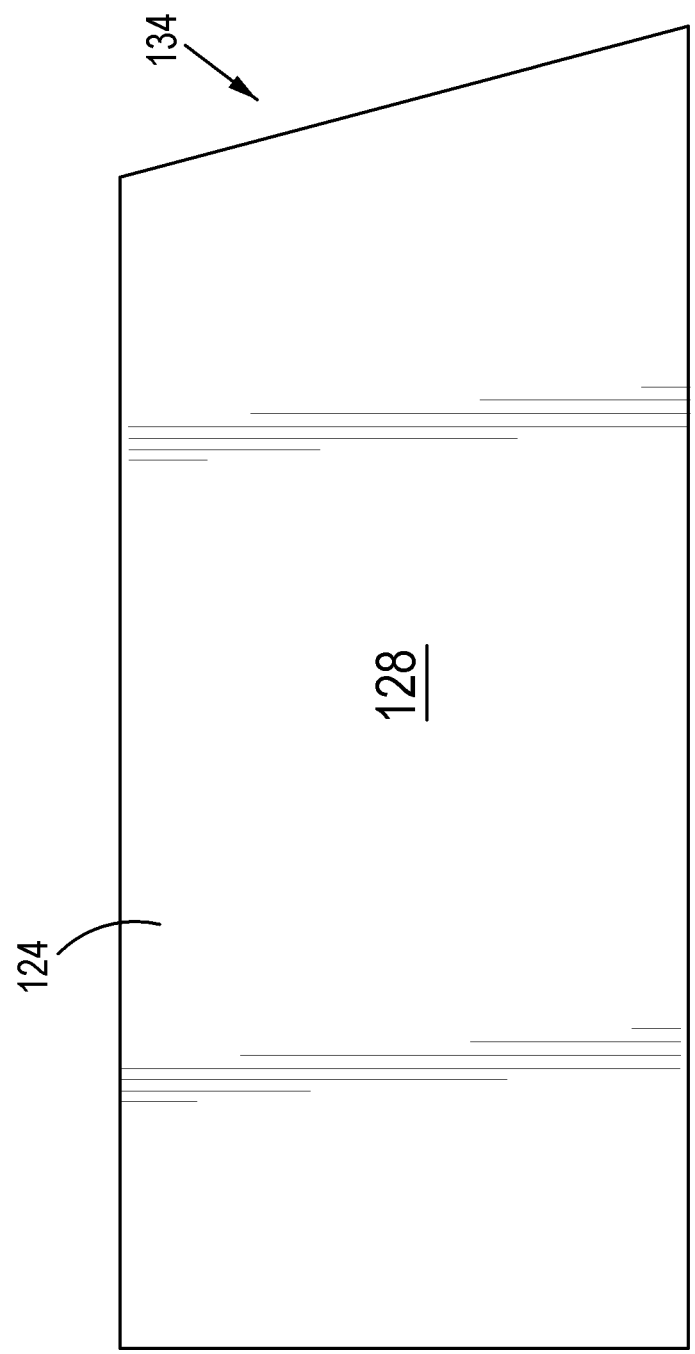
FIG. 19 shows a diagrammatic side elevation view of the tunnel member of FIG. 17.
Figure 20:
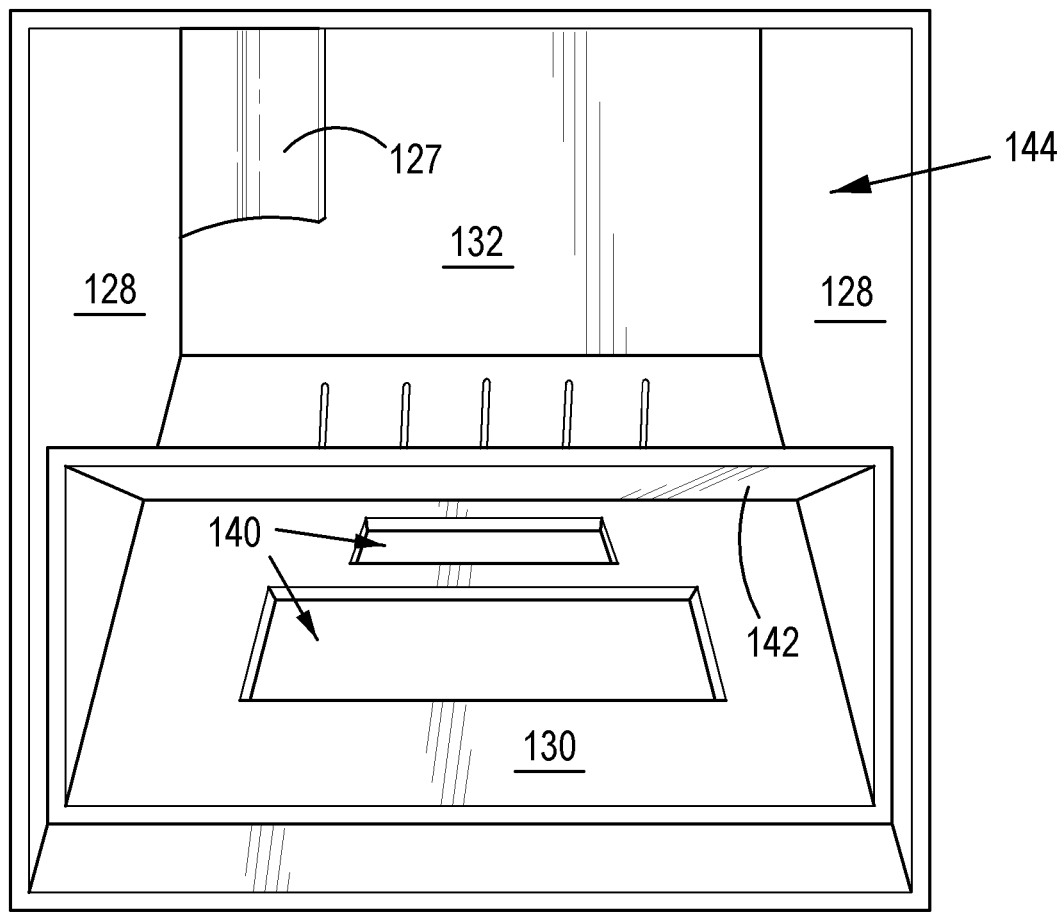
FIG. 20 shows a diagrammatic three-dimensional view from above a front end of the tunnel member of FIG. 17.
Figure 21:
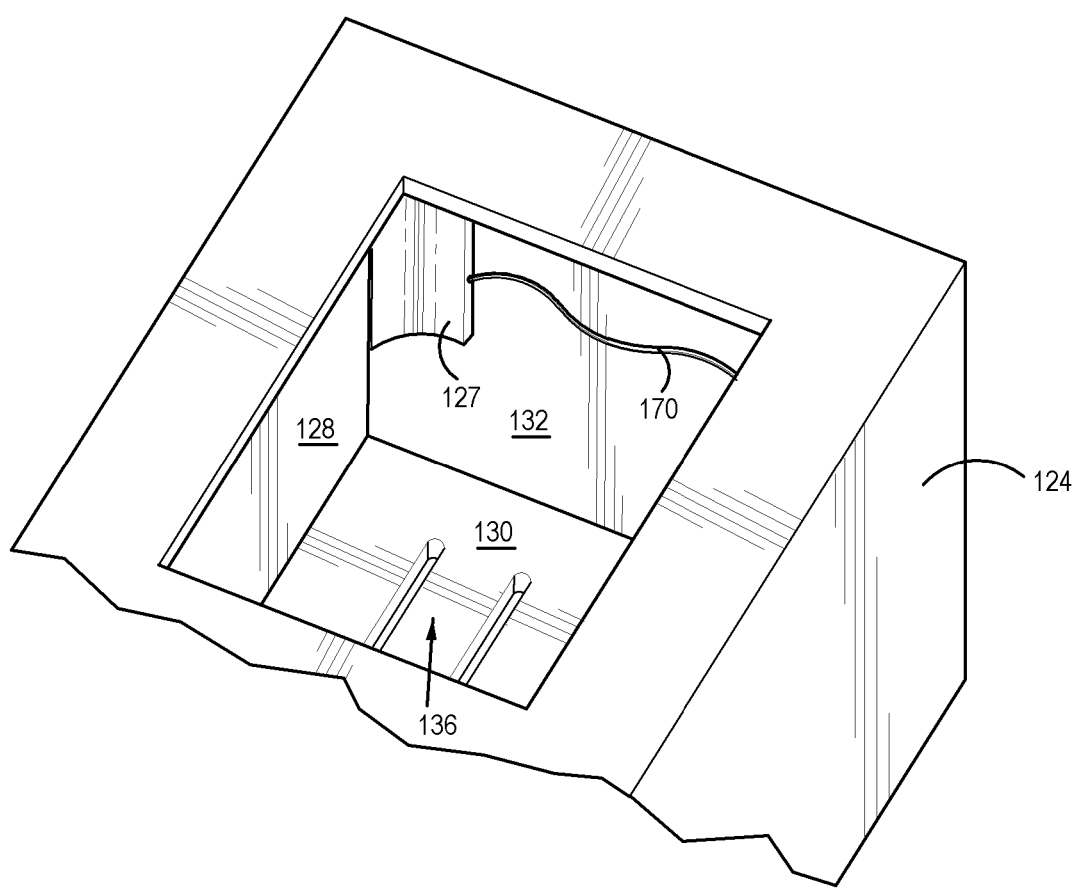
FIG. 21 shows a diagrammatic three-dimensional view of a rear part of the tunnel seen from above the tunnel member.
Figure 22:
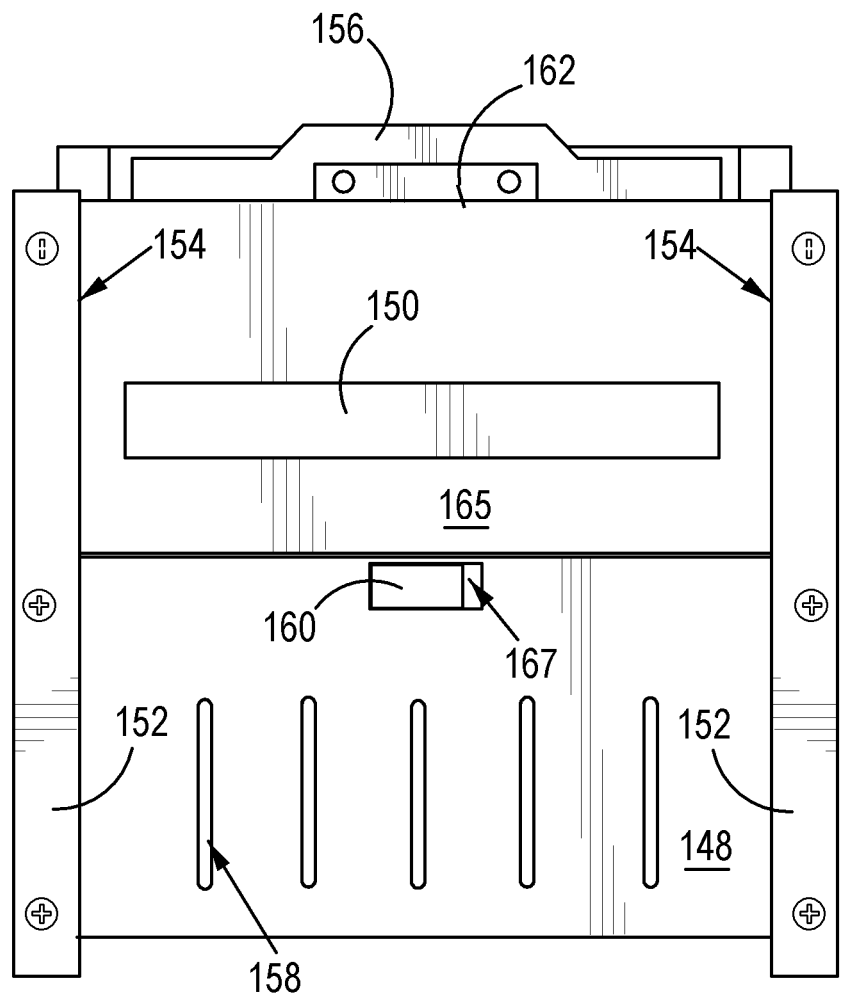
FIG. 22 shows a diagrammatic front end view of an assembly unit that includes a front wall of the housing, a door assembly and a trigger assembly forming part of the trap of FIG. 16, with a door of the door assembly in a closed position.
Figure 23:
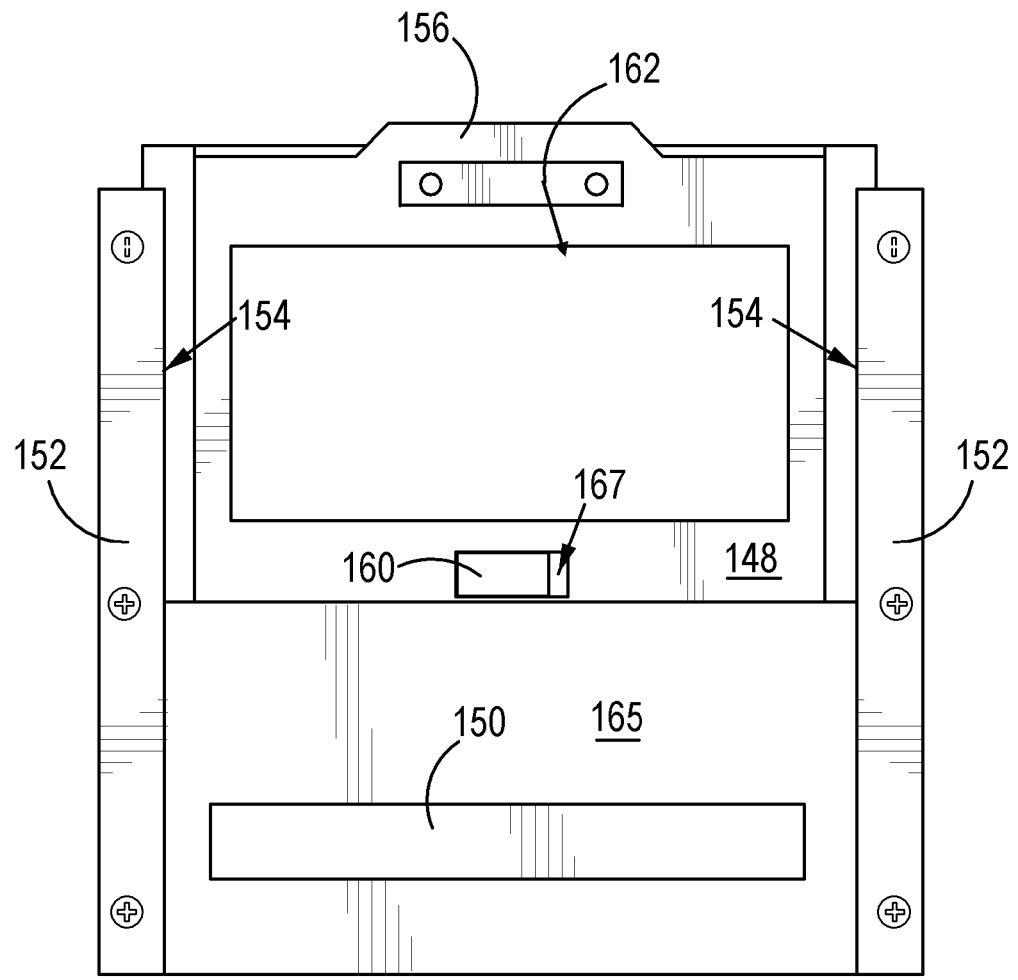
FIG. 23 shows a diagrammatic front end view of the assembly unit of FIG. 22 with the door in an open position.

In FIGS. 1 to 15, reference numeral 10 generally refers to a trap, in accordance with one aspect of the disclosure, for capturing marine animals, such as an octopus. Broadly, as shown in various figures, the trap 10 includes a housing, generally referred to by reference numeral 12, defining an interior containment space 13 and an entrance opening 26 to the interior containment space 13 through which an octopus (not shown) enters the interior containment space 13. The trap 10 also includes a trap door assembly, generally indicated by reference numeral 15, that includes a trap door 18 that is biased toward a closed position (see FIG. 7) in which the entrance opening 26 is blocked and wherein the trap door 18 is displaceable between its first, closed position and a second, open position (see FIG. 8) in which the entrance opening 26 is revealed. Further, the trap 10 includes a trigger assembly, generally indicated by reference numeral 30 (best seen in FIGS. 9 to 12 and 14), that is capable of retaining the trap door 18 in its open position against its bias, and that is capable of being triggered by an octopus (not shown) from inside the containment space 13 such that, when triggered, it causes the trap door 18 to displace from its open position to its closed position, thereby capturing the octopus within the interior containment space 13 of the housing 12. The housing 12 includes an elongated, generally rectangular, box-shaped tunnel member 16 that includes a rectangular-shaped top wall 36 and two rectangular-shaped opposing side walls 38, a bottom wall 40, a front end wall 32, and a rear end wall 42.

The top wall 36 defines a rectangular access opening 39 toward the rear end wall 42. A complementarily shaped access door 24 is provided for closing and opening the access opening 39. The access door 24 is connected to the top wall 36 with a hinge 44 at an operatively frontward edge of the access opening 39. The access door 24 also includes a catch formation 41 that snap-fits onto an upper rear edge of the tunnel member 16. In another embodiment (not shown), the access door 24 can be mounted to the top wall 36 to be displaceable in a manner other than hinging, for example, the access door can be mounted in a manner that the access door 24 is opened and closed by sliding relative to the top wall 36.

The bottom wall 40 of the tunnel member 16 defines a rectangular cut-out 46 that opens toward a front end, at 48, of the bottom wall 40. A generally rectangular shaped sheet 50 is mounted, at its rear-end portion 56, to the bottom wall 40 near a rear edge of the cut-out 46. The sheet 50 is shaped and sized so as to substantially span the cut-out 46, and a front-end portion 54 of the sheet 50 slants slightly downward to facilitate re-insertion of the trigger assembly 30, if the trigger assembly 30 has been removed for cleaning or replacement. The sheet 50 defines a transversely extending slot 52 spaced inward from the front-end portion 54 of the sheet 50. The sheet 50 is formed from a material that enables the sheet 50 to be resiliently deflectable downward (see arrow 45) if the trigger assembly needs to be removed or inserted. Both the bottom wall 40 and the sheet 50 define an array of slots 51 that allows sand to pass through from the interior of the tunnel member 16 into the ocean, and also serves to drain any excess water when the traps are removed from the water. The tunnel member 16 also includes two feet members 58 in the form of elongated rectangular bars that extend transversely across an underside of the bottom wall 40 and that are spaced apart from each other. The feet members 58 are used to secure one or more traps 10 to a cradle (not shown) so as to form a battery of traps 10 that can be raised or lowered in unison.

FIGS. 7 to 15 show an assembly unit (also previously referred to as an "interior containment space"), generally indicated by reference numeral 13, which includes the trap door assembly 15, the trigger assembly 30, and a funnel member 14 that forms part of the housing 12. The funnel member 14 includes a funnel formation 60 and a front wall 62. The front wall 62 is generally rectangular in shape and is sized and dimensioned so as to fit snugly within and across a front end portion of the tunnel member 16, thereby forming a front wall for the housing 12. The front wall 62 defines the entrance opening 26 that is generally rectangular in shape and extends across a major part of an upper half of the front wall 62. The funnel formation 60 includes a generally rectangular top wall 63 and two opposing side walls 64 and a bottom wall 66. Each side wall includes a generally rectangular trapezium-shaped middle part 68 and a relatively large rectangular-shaped part 71 at a relatively wider mouth end of the funnel formation 60 and a relatively smaller rectangular-shaped part 72 at a relative narrower mouth end of the funnel formation 60. When the funnel formation 60 is seen in its operatively upright orientation, the bottom wall extends along lower edges of the relatively smaller rectangular parts 72 of the side wall and further along an angled side edge of the trapezium middle part 68 of the side wall, so as to form a bottom wall 66 of which a substantive portion slants downwardly rearward. The funnel formation 60 is generally rectangular in cross-section and dimensioned to be complementarily shaped to a transverse section of the tunnel member 16, such that the funnel formation 60 fits snugly within the tunnel member 16 (see FIG. 2).

Moreover, as can be seen in the drawings, a relatively narrower mouth end of the funnel formation 60 fits over the entrance opening 26 and the relative wider mouth end of the funnel formation 60 terminates into the tunnel member 16, thereby forming a funnel space that widens and transitions into an elongated tunnel space. The front wall 62 also includes a catch formation 70 in the form of a rectangular bar formation that extends along a middle part of a lower edge of the front wall 62 and that is complementarily shaped and sized to be caught or engaged by the slot 52, so as to snap-fit into position when the assembly unit 13 is inserted into the tunnel member 16 of the housing 12. Broadly, the trap door assembly 15 is configured so that the trap door 18 forms a sliding trap door contained wholly within the outer periphery of the trap 10 whether in an open or closed position. The trap door assembly 15 includes sliding grooves 74 that extend along lateral side edges of the front wall 62. The grooves 74 are formed by two elongated formations 76, one each that extends along an associated lateral side edge on a front face of the front wall 62. Each elongated formation 76 is generally L-shaped in cross section and orientated so that the grooves 74 face each other. The grooves 74 are complementarily shaped and dimensioned such that side edge portions of the trap door 18 are received within the grooves 74. In this way, the trap door 18 is capable of sliding upward and downward between its closed and opened positions (see arrow 20). The trap door 18 is biased by way of a length of elastic cord, colloquially referred to as shock cord, that is attached at its respective ends at respective rear end corners, at 80, of the funnel formation 60, that the elastic cord extending along upper side edge of the funnel formation 60 into the grooves 74 and along side edges of the trap door 18 and along a lower edge of the trap door 18, so that that the elastic cord 82 resiliently urges the trap door toward its closed position. In that regard, the trap door 18 includes a complementarily-shaped groove 84 that extends along side edges of the trap door 18 and that extends along a bottom edge of the trap door 18 to assist with keeping the elastic cord in its position against the trap door 18. To this end, the trigger assembly 30 includes a trigger arm 88 that is in the form of an L-shaped flat bar. A long leg 90 of the trigger arm 88 extends transversely across and adjacent a rear face of the front wall 62 and a short leg 92 of the trigger arm projects away from the rear face of the front wall 62. A catch formation 91 in the form of a generally rectangular shaped bar projects from a front side of the long leg 90 of the trigger arm 88 through a slot opening 96 that is defined by the front wall 62.

In this embodiment, the trigger arm 88 and the slot opening 96 is positioned so that the catch formation 91 projects through the front wall 62 at a position more-or-less halfway between upper- and lower edges of the front wall 62. The catch formation 91 is shaped and dimensioned so that it interferes with displacement of the trap door 18. A corner 94 of the trigger arm 88 is pivotally mounted, at 95, to the front wall 62 with a hinge 98. The hinge 98 includes two spaced apart cleats 100 and a hinge pin 102 that extends through the cleats 100 and the corner 94 of the trigger arm 88. That way, the trigger arm 88 is able to hinge or pivot about the hinge pin 102 (see arrow 104). The angle of hinging is sufficient to withdraw the catch formation 91 in a rearward direction to a position in which the catch formation 91 avoids interference with the trap door 18 when displaced.

The trigger arm 88 is biased toward a position in which the catch formation 91 interferes with displacement of the trap door 18 by way of an elastic cord 106 that extends between an end of the short leg 92 of the trigger arm 88 and a rear of the front wall 62. A tether link 108 in the form of a cord or tether extends from an end of the long leg 90 through an opening, at 110, in the bottom wall 66 of the funnel formation 60 into the containment space 13 of the housing 12 for attaching to a lure or bait inside the containment space 13.

In use, a lure or bait 112 is attached to that end of the tether 108 that is inside the containment space 13 of the housing 12. The trap door 18 is then set in its open position by first hinging the trigger arm 88 (see arrow 104) against the bias of the elastic cord 106 so that the catch formation 91 is held in a withdrawn position that permits sliding of the trap door 18 to its open position (see FIG. 8). The trap door 18 is displaced against the bias of the elastic cord 82 to its open position and held in place until the trigger arm 88 is released so that it returns to its resting position in which the catch formation 91 protrudes through the slot 96. Then, if the trap door is released, the catch formation 91 interferes with an upper edge of the trap door 18, thus preventing the trap door 18 from displacing under influence of its bias to the closed position. Then, the assembly unit 13 is inserted into the tunnel member 16 (see arrow 22 in FIG. 2), and pushed rearward into the tunnel member 16 until the catch formation 70 engages the slanted front portion of the sheet 50, which causes the sheet 50 to deflect downwardly, permitting the assembly unit 13 to be pushed further into the tunnel member 16 until the catch formation 70 engages the slot 52, which causes the assembly unit 13 to snap fit in position so that it is secured from sliding out of the tunnel member 16 while in use. Instead of removing the assembly unit 13 from the tunnel member 16 to reset the door 18, it is also possible to access the interior space from the access opening 39, and to pull the tether 108 so as to withdraw the catch formation 91. The trap 10 is then placed underwater with the entrance opening 26 in the open position and the openings or slots 51 in the bottom wall 40 permitting water to rapidly fill or drain from the containment space 13 of the trap 10 and also allowing for entrapped sand to be drained from the interior of the trap. The trap 10 can be lowered underwater (not shown). Once lowered into the water, an octopus can now enter the interior space 13 of the housing 12 through the entrance opening 26. When the octopus is inside the interior space 13 it can engage the lure or bait 112. When the lure or bait 112 is pulled in such a way that the tether 108 is tensioned, then the tether 108 pulls the end of the long leg 90 of the trigger arm 88, which causes the trigger arm to hinge against the bias of the elastic cord 106 (see arrow 104). That causes the catch formation 91 to withdraw rearwardly until it avoids interfering with the trap door 18, which releases the trap door 18 to be displaced to its closed position under influence of the bias of the elastic cord 82. The octopus is thereby trapped within the trap 10.

The trap 10, when removed from the water, allows the water and sand to rapidly exit the interior space 13 though the openings or slots 51 in the bottom wall 40. The catch formation 41 of the access door 24 is then detached from the upper rear edge of the tunnel member 16 and opened so that the octopus can be removed through the access opening 39. The access door 24 is then closed again and secured with the catch formation 41 that snap fits onto the upper edge of the tunnel member 16. The trap can then be reset by lowering the door 18 while pulling on the tether 108, before allowing the catch formation to return to its original position in which it holds the door 18 against its bias. Alternatively, this can also be done by removing the assembly 30 by deflecting the sheet 50 until the catch formation 70 is released from the slot 52 so that the assembly unit 13 can be removed from the tunnel member 16.

In FIGS. 16 to 23, reference numeral 120 generally refers to another embodiment of a trap in accordance with the disclosure. Some of the components of the trap 120 are either not shown or partly obscured in those figures, such as a trigger assembly, a biasing part of the door assembly, and an access door for the access opening in the top wall of the tunnel member, and the like. Those parts form part of trap 120 and are similar to the ones described with reference to trap 10. It follows that those parts described with reference to trap 10 that are operationally required for the working of trap 120 are meant to form part of trap 120. It will be appreciated that some modification of those parts may be needed to adapt them for working with trap 120.

The trap 120 includes a housing, generally indicated by reference numeral 122. The housing 122 includes an elongated, generally rectangular, box-shaped tunnel member 124 that includes a rectangular-shaped top wall 126 and two opposing side walls 128, and a bottom wall 130, and a rear end wall 132. In this embodiment, a front end, at 134, of the tunnel member 124 slants upwardly rearward. The top wall 126 defines a rectangular access opening 136 toward the rear end wall 132 that is closed and opened with an access door 137 that can be hingedly or slidably attached to the top wall 126. For ease of explanation, the access door 137 is not shown in FIGS. 17 to 23. The bottom wall 130 defines a plurality of slots 138 toward a rear end of the housing 122 and rectangular openings 140 that are lengthwise spaced apart more-or-less on a front half portion of the bottom wall 130. The housing 122 also includes an inner wall 142 that is orientated generally face-to-face or co-terminously with the top wall 126, and that extends transversely across the contained space 144 of the tunnel member 124, slanting downwardly toward the rear of the housing 122. That way the housing 122, not unlike housing 12, also defines an interior space that includes a funnel space that widens from the front end of the housing 122 into a rearward tunnel space of the housing 122.

The housing 122 further includes a front wall 148 that defines an upper entrance opening 162. The front wall also includes an array of slots 158 and an elongated catch formation 156 at an upper edge of the front wall 148 that cooperates with a complementarily shaped slot 164 provided in the top wall 126 of the tunnel member 124 for keeping the front wall 148 in position when it is mounted into the front end portion of the tunnel member 124. The front wall 148 also includes a stop member toward an upper edge for the front wall for retaining the trap door 165 in its closed position.

Trap 120 includes a trap door assembly that is similar to that of trap 10, and includes a trap door 165, and groove formations 152 that define grooves 154 within which the trap door 165 slides up and down face-to-face with the front wall 148. The trap door 165 also includes a handle 150.

Although the triggering assembly is largely obscured from view in FIGS. 16 to 23, a catch formation 160 is shown that projects from a trigger arm of the trigger assembly through the slot 167 in the front wall 148, and operates similarly to that described in relation to trap 10 above. A link, rope, cable, or the like that forms a tether 170 for the trap 120 extends from the trigger arm to the rear end of the housing 122 and is routed through a formation 127 that assists with holding the tether 170 in its operational position. The trap 10, 120 is useful in that its interior space defines a funnel space that widens from a relatively constricted entrance opening into a wider rearward extending tunnel space that resembles a tunnel rock formation that widens into a tunnel space through a relatively smaller opening, which appeals to an octopus and, therefore, enhances the efficiency of the trap 10, 120. With reference to trap 10, it is also useful in that the lure or bait 112 can be positioned near the funnel space and the depth of the tunnel space is such that an octopus can enter the interior space and move toward the rear of the tunnel member where it can turn around and engage the lure or bait 112 from behind, and as such, accommodates the natural behavior of the octopus. In addition, the sloping or slanting walls 66, 142 resist obscuring the lure or bait 112 as it otherwise would have been if it was positioned close to the front wall 62, 148, thus, in these embodiments, the lure or bait is more conspicuous to an octopus swimming past the open entrance opening 26, 162. The trap 10, 120 is also useful in that the door 18, 165 remains face-to-face within a boundary of the front wall 62, 148, and as such, does not project beyond the front wall, which avoids water currents acting on the trap door 18, 165 in a manner that can move or tilt the trap 10, 120. For the avoidance of doubt, it is to be appreciated that reference to a face-to-face arrangement specifically refers to a substantially co-planar and co-terminous relationship between the door 18, 165 and the front wall 62, 148. The Applicant(s) believes it advantageous that the trap 10 finds particular application in that it is not readily affected by water currents, i.e., the door 18, 165 is co-terminous with, and does not protrude from, the front wall 62, 148 when in the open position. Such protrusion of the door from the front wall can act as a "sail," where water currents impact on the protruding door (known in the art) to potentially move or tilt the trap 10, 120.

The trap 10, 120, is also useful in that the bottom wall of the housing includes slots to fill the interior space of the trap 10, 120 with water so as to cause sinking of the trap into the water, and to drain water from the interior space. Usefully, the slots also serve to remove sand from the interior space of the trap 10, 120. Yet further, the trigger assembly and door assembly form an assembly unit 13 for the trap 10 that facilitates the ease of replacement of a faulty assembly unit 13. Also, the trap 10, 120 is substantially formed from a high-density plastics material that is durable and lightweight for ease of handling and transport. In another embodiment (not shown), the funnel formation 60 can be mounted fixedly inside the tunnel member 16, as opposed to being mounted to the front wall 62. In the specification, including the claims, where the context permits, the term "comprising" and variants thereof such as "comprise" or "comprises" are to be interpreted as including the stated integer or integers without necessarily excluding any other integers. It is to be understood that the terminology employed above is for the purpose of description and should not be regarded as limiting. The described embodiment is intended to be illustrative of the disclosure, without limiting the scope thereof. The disclosure described herein is capable of being practiced with various modifications and additions as will readily occur to those skilled in the art. The use of words that indicate orientation or direction of travel is not to be considered limiting. Thus, words such as "front," "back," "rear," "side," "up," "down," "upper," "lower," "top," "bottom," "forward," "backward," "toward," "distal," "proximal," "in," "out" and synonyms, antonyms and derivatives thereof, have been selected for convenience only, unless the context indicates otherwise. The applicants envisage that various exemplary embodiments of the claimed subject matter can be supplied in any particular orientation and the claimed subject matter is intended to include such orientations. Thus, regardless of the content of any portion (e.g., title, field, background, summary, description, abstract, drawing figure, etc.) of this application, unless clearly specified to the contrary, such as via explicit definition, assertion, or argument, or clearly contradicted by context, with respect to any claim, whether of this application and/or any claim of any application claiming priority hereto, and whether originally presented or otherwise:

a. there is no requirement for the inclusion of any particular described or illustrated characteristic, function, activity, or element, any particular sequence of activities, or any particular interrelationship of elements;

b. no characteristic, function, activity, or element is "essential";

c. any elements can be integrated, segregated, and/or duplicated;

d. any activity can be repeated, any activity can be performed by multiple entities, and/or any activity can be performed in multiple jurisdictions; and e. any activity or element can be specifically excluded, the sequence of activities can vary, and/or the interrelationship of elements can vary.

The invention claimed is:

1. A trap for catching an octopus, which trap includes:
a housing shaped and sized to define an interior containment space expanding in transverse section from an entrance opening through which an octopus may enter, the housing comprising:
    an elongated box-shaped tunnel member having an open end, a bottom wall of the elongated box-shaped tunnel member defining a cut-out that opens towards a front end of the bottom wall, with a generally rectangular-shaped sheet mounted onto the bottom wall near a rear edge of the cut-out, the generally rectangular-shaped sheet shaped and sized to substantially span the cut-out and comprising a front end portion slanting downwardly; and
    a funnel member including an end wall defining the interior containment space, the funnel member including a funnel formation having a relatively narrower mouth-end shaped to fit over the entrance opening and extending away from the end wall with a relatively wider mouth terminating into the tunnel member to form a funnel space that widens and transitions into a tunnel space;
a trap door assembly including a trap door biased towards a first, closed position in which the entrance opening is blocked, the trap door being displaceable between the closed position and a second, open position in which the entrance opening is revealed; and
a trigger assembly capable of retaining the trap door in its open position against its bias, and capable of being triggered by an octopus from inside the containment space such that, when triggered, it causes the trap door to displace from its open position to its closed position thereby to capture the octopus within the interior containment space of the housing, and wherein the trigger assembly is capable of retaining the trap door in its closed position once triggered.

2. The trap of claim 1, wherein the trap door is mounted onto the end wall of the housing in a manner such that the trap door is capable of being displaced face-to-face with the end wall between its closed position and open position.

3. The trap of claim 1, wherein the funnel member and the trigger assembly form an assembly unit that is removably receivable in an associated end portion of the elongated box-shaped tunnel member.

4. The trap of claim 1, wherein the trigger assembly includes a trigger arm that interacts with the trap door for retaining the trap door in its open position against its bias, and when triggered, to cause the trap door to displace from its open position to its closed position.

5. The trap of claim 4, wherein the trigger assembly includes a link member that is attached at its one end to the trigger arm, and at its other end to a lure or bait, such that when the lure or bait is moved in a way that tensions the link member, the trigger arm is triggered which causes the trap door to displace from its open position to its closed position.

6. The trap of claim 5, wherein the bait is positioned proximal to, or towards, the funnel space of the housing.

7. The trap of claim 5, wherein the bait is positioned distal to the funnel space of the housing, towards an opposed end of the housing.

8. The trap of claim 7, wherein the bait is positioned distal to the funnel space, the link member is slidably contained by a guide attached to a rear wall of the housing, through which the link member is passed.

9. The trap of claim 1, wherein the funnel member and the trigger assembly form an assembly unit that is removably receivable in an associated end portion of the elongated box-shaped tunnel member.

10. The trap of claim 9, wherein the funnel member and trigger assembly unit are removably secured within the housing by a biased latch in the form of a resiliently flexible base or sheet member.

11. The trap of claim 10, wherein the resiliently flexible base or sheet member is biased towards an interior of the housing, the biased latch being capable of interlocking with a catch formation protruding from a lower surface of the assembly unit when the assembly unit is positioned inside the housing.

12. The trap of claim 1, wherein the bottom wall of the housing includes slots to fill the interior space of the trap with water so as to cause sinking of the trap into the water, and to drain water and sand from the interior space when the trap is removed from the water.

* * * * *